Dec. 22, 1936.  W. A. HEINRICH  2,065,184
GROUND ROD
Filed Aug. 7, 1935
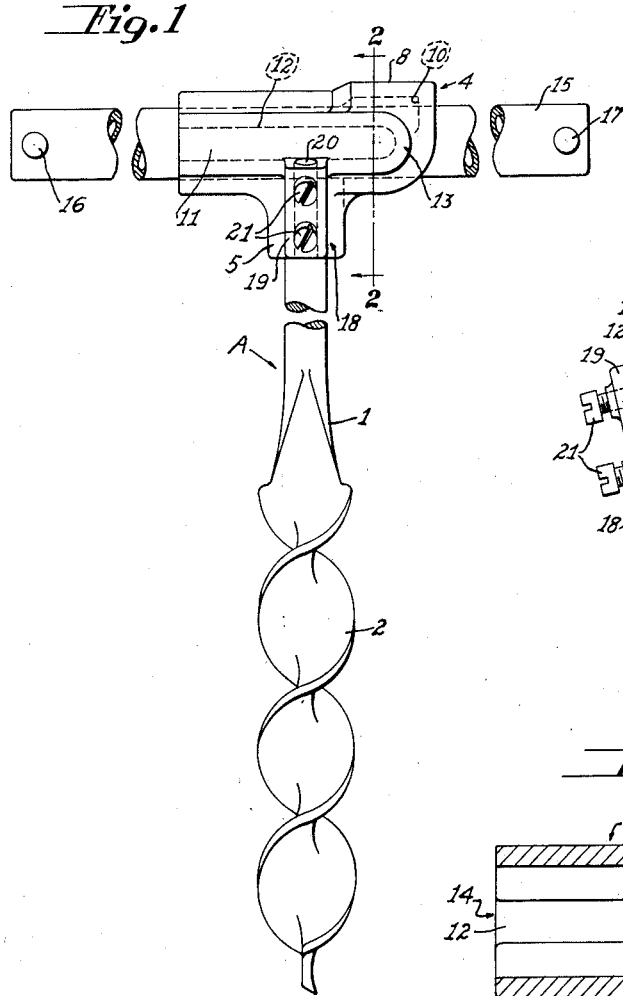
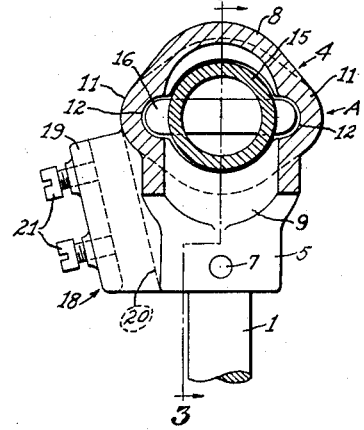
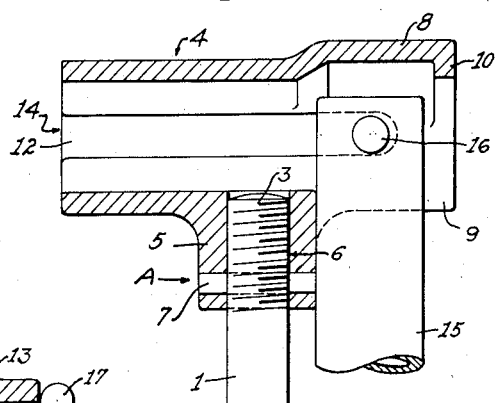
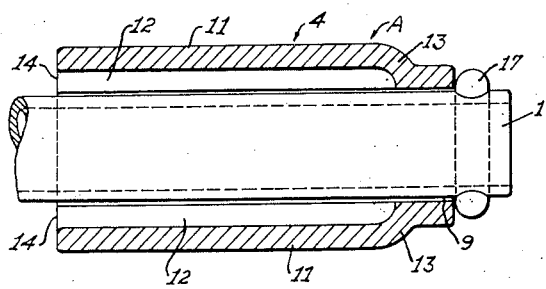
INVENTOR
WALTER A. HEINRICH
BY E. M. Harrington
ATTORNEY Patented Dec. 22, 1936

2,065,184

UNITED STATES PATENT OFFICE 2,065,184

GROUND ROD

Walter A. Heinrich, St. Louis, Mo., assignor to James R. Kearney Corporation, St. Louis, Mo., a corporation of Missouri Application August 7, 1935, Serial No. 35,084

6 Claims. (Cl. 173—31)

This invention relates generally to ground rods adapted for temporary use in connection with electrical grounding equipment, and more specifically to ground rods of the type adapted to be screwed into the ground, the predominant object of the invention being to provide a ground rod of this type which includes a displaceable handle capable of being arranged relative to the body portion of the ground rod so as to provide the ground rod with a transversely extended handle to facilitate screwing the rod into or out of the ground, and which handle is capable of displacement from its transverse arrangement to a position substantially parallel with respect to the body portion of the ground rod so as to permit storing the ground rod away in a small space when not in use.

Ground rods of the type disclosed herein are frequently carried about in trucks, and it is highly desirable that they occupy as little space as possible within the trucks. I have therefore devised the improved ground rod disclosed herein which, as stated above, includes a handle that is capable of being moved to a transverse position relative to the body portion of the ground rod to provide a T-type handle, which greatly facilitates screwing the ground rod into or out of the ground. Also, when the ground rod is not in use and it is desired to store same away in a small space, as, for instance, in a truck, the handle may be moved from its transverse position to a position where it is extended parallel with respect to the body portion of the ground rod.

Fig. 1 is a side elevation of the improved ground rod with parts thereof broken away to conserve space.

Fig. 2 is an enlarged section on line 2—2 of Fig. 1 with the body portion of the ground rod broken away.

Fig. 3 is a section on line 3—3 of Fig. 2, but with the handle of the ground rod disposed in a position parallel with respect to the body portion of the ground rod.

Fig. 4 is a horizontal section taken through the head of the improved structure, showing the handle drawn to the limit of its movement with respect to said head in one direction.

In the drawing, wherein is shown for the purpose of illustration, merely, one embodiment of the invention, A designates the improved ground rod generally. The ground rod A includes a body portion 1 in the form of a rod which is provided with a ground-entering auger portion 2 adapted to be screwed into and out of the ground by rotating the body portion 1 about its major axis. At the end thereof opposite to the end at which the auger portion is located the body portion 1 is provided with a screw-threaded portion 3.

Associated with the body portion 1 of the improved ground rod is a head 4 which is provided with an extension 5 having a screw-threaded opening 6 formed therein. The screw-threaded opening 6 receives the screw-threaded end portion 3 of the body portion 1, and to prevent unintended unscrewing of the head and body portion of the ground rod a pin 7 is passed through openings formed through the wall of the extension 5 and through the screw-threaded portion 3 of the body portion 1 (Fig. 3). The head 4 is of substantially tubular formation and is provided with an end portion 8 which is of slightly greater height than the remainder of the head, as shown in Figs. 1, 2, and 3. Also, this end portion 8 is open at the bottom, as illustrated at the point indicated by the reference character 9 in Figs. 2 and 3, as well as at its outer end, and is provided with a downturned end flange portion 10 at its top, the lower edge of which is alined with the upper portion of the inner face of the main portion of the head. Formed at opposite sides of the head 4 is a pair of outwardly projected extensions 11, in each of which an elongated depression 12 is formed which provides a guideway. By referring to Fig. 4 it will be noted that the extensions 11 extend from one end of the head 4 to a point short of the opposite end where the extensions merge into the portion 8 of the head, as indicated at 13, the depressions 12 being open at the ends of the extensions which are located at an end of the head, as indicated at 14 in Fig. 4, and being closed at the ends of the extensions which merge into the head short of the opposite end thereof. The depressions are preferably, though not necessarily, of curved formation.

The improved structure includes a handle 15 which, as illustrated in the drawing, is formed of tubing, although obviously this handle may be in the form of a section of rod of solid cross-section. At the opposite ends of the handle 15 pins 16 and 17 are extended through and are fixedly seated in openings formed transversely through the handle, these pins preferably being rounded at their opposite ends, as shown most clearly in Figs. 2 and 4, so as to correspond in shape at said outer ends to the shape of the depressions 12 of the head 4. The handle 15 is supported within the tubular head 4 so as to be capable of sliding longitudinally thereof.

Associated with the head 4 of the improved structure is means 18 for attaching a ground wire (not shown) to the ground rod. This means comprises an extension 19 formed on the head through which an opening 20 is formed. The ground wire attaching means includes also a pair of clamping screws 21 which extend through openings formed in the extension 19 and are adapted to enter the wire-receiving opening 20 in order to clamp a wire therein in an obvious manner.

When the ground rod is in use, the handle 15 is disposed, as illustrated in Fig. 1, in transverse relation with respect to the body portion of the ground rod whereby a T-type handle is provided, which facilitates screwing the ground rod into or out of the ground. When so disposed the outer face of the handle contacts closely with the face of the opening extended longitudinally through the tubular head 4, and portions of said handle extend outwardly in opposite directions beyond the head. Obviously these extended portions of the handle may be grasped for rotating the ground rod about the major axis of the body portion thereof in order to screw the ground rod into or out of the ground. When, however, the improved ground rod is not in use and it is desired to move the handle 15 to a position parallel with respect to the body portion of the ground rod so that less storage space will be required for the ground rod, the handle 15 is moved longitudinally to the right in Fig. 1, the opposite end portions of the pins 16 of the handle entering and moving longitudinally of the oppositely located depressions 12. When the opposite end portions of the pin 16 reach the closed ends of the depressions the extended free end portion of the handle is swung downwardly in an arc of a circle to a position where the handle is disposed substantially parallel with respect to the body portion of the ground rod, as shown in Fig. 3, the opposite end portions of the pin 16 providing trunnions about which the free end portion of the handle is moved and the enlarged portion 8 of the head providing sufficient space for arcuate movement of the corners of the handle about the trunnions. Obviously, in order to move the handle 15 from its inactive position shown in Fig. 3 to its active position shown in Fig. 1, it is necessary merely to move the free end portion of the handle to a position where the handle is alined with the head 4. The handle may then be moved longitudinally through the head until portions of said handle extend beyond the head at opposite sides thereof.

The opposite extended end portions of the pin 17 are adapted to contact with an end of the head, as shown in Fig. 4, so as to prevent unintended removal of the handle entirely from the head by moving the handle to the left in Fig. 1.

I claim:

1. A ground rod comprising a body portion including a portion adapted to be introduced into the ground, a head fixed to said body portion, said head having a bore formed therein, a handle supported for sliding movement by the bore of said head, said handle being adapted to be arranged in an effective position transverse with respect to the body portion of the ground rod and being movable to an ineffective position substantially parallel with respect to said body portion, said head being provided with a guideway formed in the face of the bore thereof, and extended means carried by said handle and extended laterally with respect thereto, a portion of which is movable into said guideway to provide a trunnion about which said handle may be moved.

2. A ground rod comprising a body portion including a portion adapted to be introduced into the ground, a head fixed to said body portion, said head having a bore formed therein, a handle supported for sliding movement by the bore of said head, said handle being adapted to be arranged in an effective position transverse with respect to the body portion of the ground rod and being movable to an ineffective position substantially parallel with respect to said body portion, said head being provided with oppositely disposed guideways formed in the face of the bore thereof, and extended means carried by said handle, portions of which are movable into said guideways to provide trunnions about which said handle may be moved.

3. A ground rod comprising a body portion including a portion adapted to be introduced into the ground, a head fixed to said body portion, said head having a bore formed therein, a handle supported for sliding movement by the bore of said head, said handle being adapted to be arranged in an effective position transverse with respect to the body portion of the ground rod and being movable to an ineffective position substantially parallel with respect to said body portion, said head being provided with oppositely disposed guideways formed in the face of the bore thereof, each of which is open at one end and closed at the opposite end, and extended means carried by said handle, portions of which are movable into said guideways to provide trunnions at the closed ends of said guideways about which said handle may be moved.

4. A ground rod comprising a body portion including a portion adapted to be introduced into the ground, a head fixed to said body portion, said head having a bore formed therein, a handle supported for sliding movement by the bore of said head, said handle being adapted to be arranged in an effective position transverse with respect to the body portion of the ground rod and being movable to an ineffective position substantially parallel with respect to said body portion, said head being provided with oppositely disposed guideways formed in the face of the bore thereof, each of which is open at one end and closed at the opposite end, and extended means carried by said handle, portions of which are movable into said guideways to provide trunnions at the closed ends of said guideways about which said handle may be moved, said bore being enlarged at an end thereof and being open at an end and at the bottom of said enlarged portion to permit movement of the handle about the trunnions provided by said extended means.

5. A ground rod comprising a body portion including a portion adapted to be introduced into the ground, a head fixed to said body portion, said head having a bore formed therein, a handle supported for sliding movement by the bore of said head, said handle being adapted to be arranged in an effective position transverse with respect to the body portion of the ground rod and being movable to an ineffective position substantially parallel with respect to said body portion, said head being provided with oppositely disposed guideways formed in the face of the bore thereof, each of which is open at one end and closed at the opposite end, extended means carried by said handle, portions of which are movable into said guideways to provide trunnions at the closed ends of said guideways about which said handle may be moved, said bore being enlarged at an end thereof and being open at an end and at the bottom of said enlarged portion to permit movement of the handle about the trunnions provided by said extended means, and wire-clamping means associated with said head.

6. A ground rod comprising a body portion including a portion adapted to be introduced into the ground, a head fixed to said body portion, said head having a bore formed therein, a handle supported for sliding movement by the bore of said head, said handle being adapted to be arranged in an effective position transverse with respect to the body portion of the ground rod and being movable to an ineffective position substantially parallel with respect to said body portion, said head being provided with oppositely disposed guideways formed in the face of the bore thereof, extended means carried by said handle, portions of which are movable into said guideways to provide trunnions about which said handle may be moved, and a second extended means carried by said handle adapted to engage a portion of said head to prevent unintended detachment of the handle from the head.

WALTER A. HEINRICH.